United States Patent
Edlund et al.

(10) Patent No.: US 6,484,162 B1
(45) Date of Patent: Nov. 19, 2002

(54) LABELING AND DESCRIBING SEARCH QUERIES FOR REUSE

(75) Inventors: Stefan B. Edlund, Sunnyvale, CA (US); Michael Lawrence Emens, San Jose, CA (US); Reiner Kraft, Morgan Hill, CA (US); Peter Chi-Shing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,991

(22) Filed: Jun. 29, 1999

(51) Int. Cl.[7] ............................................. G06F 17/30
(52) U.S. Cl. ............................................. 707/3; 707/5
(58) Field of Search .............................. 707/1, 3, 9, 10, 707/4, 104, 5, 500, 533, 2, 103, 6; 382/54; 705/10, 26, 2, 35, 39; 706/45, 46; 709/229, 313

(56) References Cited

U.S. PATENT DOCUMENTS

| | | | |
|---|---|---|---|
| 5,067,166 A | 11/1991 | Ito | 382/37 |
| 5,220,625 A * | 6/1993 | Hatakeyama et al. | 382/54 |
| 5,404,510 A | 4/1995 | Smith et al. | 395/600 |
| 5,412,806 A | 5/1995 | Du et al. | 395/600 |
| 5,471,677 A | 11/1995 | Imanaka | 395/600 |
| 5,511,190 A | 4/1996 | Sharma et al. | 395/600 |
| 5,778,368 A | 7/1998 | Hogan et al. | 707/10 |
| 5,778,378 A | 7/1998 | Rubin | 707/103 |
| 5,848,404 A | 12/1998 | Hafner et al. | 707/3 |
| 6,169,992 B1 * | 1/2001 | Beall et al. | 707/103 |
| 6,269,368 B1 * | 7/2001 | Diamond | 707/6 |
| 6,285,998 B1 * | 9/2001 | Black et al. | 707/4 |

OTHER PUBLICATIONS

"Deriving a Heuristic Function of an A* Search for Optimal Reducers in Query Processing", *IBM Technical Disclosure Bulletin*, vol. 33, No. 7, Dec. 1990, pp. 454–457.

"Display of Graphical Query Results", *IBM Technical Disclosure Bulletin*, vol. 37, No. 11, Nov. 1994, pp. 225–227.

* cited by examiner

*Primary Examiner*—Diane D. Mizrahi
*Assistant Examiner*—Apu Mofiz
(74) *Attorney, Agent, or Firm*—David A. Hall; Heller, Ehrman, White & McAuliffe

(57) ABSTRACT

A system and method associates a label and description with a search query such that the query, label, and description can be stored in a shared query repository so that queries can be retrieved by multiple users for reuse. The shared query repository can be searched, so that an appropriate query can be located, retrieved, and then submitted for execution over a document database by a search engine. Retrieved queries can be combined with other retrieved queries or modified with new search terms, and the new combined search query can be used for a new search on the database. The database search system and method efficiently permits reuse of search queries and facilitates sharing of search strategies.

34 Claims, 9 Drawing Sheets

LABELING AND DESCRIBING SEARCH QUERIES FOR REUSE

BACKGROUND OF THE INVENTION

1. Field of the Invention

This invention relates generally to network computer systems and, more particularly, to searching content of network document databases with a search query interface.

2. Description of the Related Art

Computer systems can store tremendous amounts of data that can be searched to identify and retrieve pertinent information. Data stored in a computer database is very useful when it is shared over a network with many users who can gain access to the data via computer programs known as search engines. A conventional example of a large network database is the collection of data files loosely referred to as the Internet. The Internet includes data files comprising documents that contain text, audio, and video information.

A user typically accesses the Internet database through a graphical user interface (GUI) program called a web browser. An Internet search engine can receive a user search query specifying search terms and can consult a database index to find documents relevant to the search terms. A user accesses an Internet search engine by directing the user's web browser to a search engine website and providing a search query to the search engine. The query typically comprises a string of relevant terms comprising words and phrases connected by optional Boolean operators. After the user submits the query to the search engine, a computer at the search engine website that receives the query matches it to a collection of indexed Internet documents or files, and returns search results comprising a list of the matched Internet documents. It is not unusual for an Internet search engine to match tens of thousands of documents (or more) to the search query.

Because the many thousands of document matches typically returned can easily overwhelm a user, and because many of the matches returned are usually not especially relevant to the information being sought, a user typically reduces the number of match documents by modifying the search query with additional search terms or more specific terms, or both, thereby refining the query. The process of refining the search query is typically one of trial and error and can be a very laborious task. It may be necessary to formulate many successive search queries, comprising strings of terms and phrases. Time to carry out the searches and receive results may be too high, and interruptions in network access can add to the frustration.

Once a user constructs a useful search query, the user may want to repeat the query at a later time. This need occurs, for example, either because the earlier search results must be reviewed or because the search results must be updated due to database additions and modifications. Repeating a search query may require duplication of a rather complicated string of terms and phrases, which might have been laboriously created and which can be quite difficult to reconstruct. Thus, reuse of search queries is rather limited and inconvenient.

In addition to reuse of search queries, it may be helpful to share search queries with multiple users. Sharing of search queries would maximize group efforts to find information of interest and to develop optimal search strategies. It may be possible to save a search query as a string of alphanumeric text that is saved in user memory. The saved search query could be called up later, to be retrieved into the search user interface program and submitted to the search engine. This technique saves the search query, but not the search results. Moreover, this does nothing to make sharing search queries and search results among multiple users more convenient.

From the discussion above, it should be apparent that there is a need for a database search system and method that can efficiently permit reuse of search queries and facilitate sharing of search strategies. The present invention fulfills this need.

SUMMARY OF THE INVENTION

The present invention provides a system and method for associating a label and description with a search query such that the query, label, and description can be stored in a shared query repository such that queries can be retrieved by multiple users for reuse. The shared query repository can be searched, so that an appropriate query can be located, retrieved, and then submitted for execution over a document database to identify relevant documents. Queries retrieved from the repository can be combined with other retrieved queries or modified with new search terms, and the new combined search query can be used for a new search on the database. Thus, search of a document database as well as of a shared search query repository is enabled. In this way, the present invention provides a database search system and method that can efficiently permit reuse of search queries and facilitate sharing of search strategies.

In one aspect of the invention, a convenient graphical user interface provides access to search query submission, search query searching, and document retrieval functions. The search to query submission, search query searching, and document retrieval can occur over a network computer system, such as the Internet, a corporate intranet, or other computer networks that permit multiple users to share data and computer resources. A query repository stores search queries according to query label and description, and also communicates with the network, while a search session management component controls access to the database of searched documents and to the label/query description pairs. The database of searched documents can comprise, for example, the Internet. This permits efficient reuse of search queries and sharing of database search strategies.

Other features and advantages of the present invention should be apparent from the following description of the preferred embodiments, which illustrate, by way of example, the principles of the invention.

DESCRIPTION OF THE PREFERRED EMBODIMENTS

Figure 1:
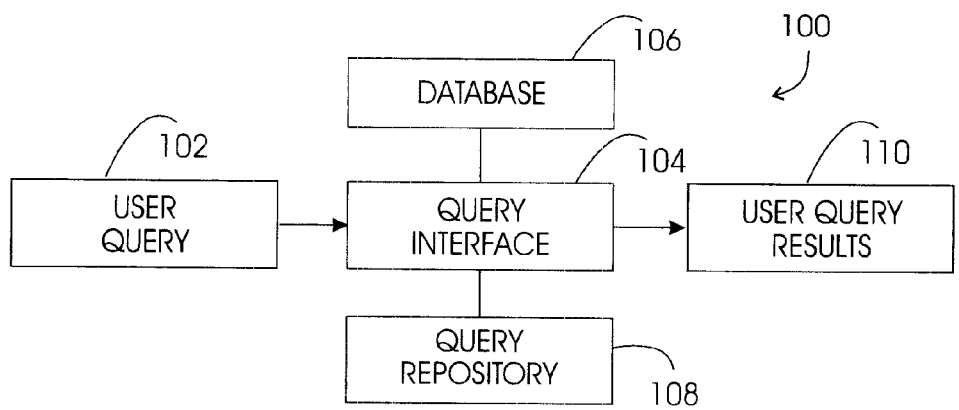
FIG. 1 is a representation of information flow in a computer processing system constructed in accordance with the present invention.

FIG. 1 is a representation of information flow in a computer processing system 100 constructed in accordance with the present invention to provide search query reuse. In the system 100, a user generates a search query 102 and provides it to a Query Interface 104. The Query Interface processes the search query and retrieves one or more documents from a database of documents 106. The database 106 may comprise a collection of files interconnected by a network, such as the files and information that are available over the Internet. The user search query can be applied either directly to the database 106, or can be applied to a Search Query Repository 108 in which search queries are stored. In this way, search queries themselves can be searched. Search queries stored in the repository 108 are associated with a label and a description for more convenient searching and retrieval. The stored search queries may include search queries contributed by all users of the system 100, even if the users are located at distinct, independent computer sites. The results of the user search query, comprising either documents retrieved from the database 106 or queries retrieved from the repository 108, are provided in a results format 110 so a user can review the results and, if desired, store the query in the repository 108 or retrieve relevant documents from the database 106. If the query is stored in the Search Query Repository 108, an authorized user communicating with the Query Interface can retrieve the search query and apply it against the database 106. In this way, the system 100 efficiently permits reuse of search queries and facilitates sharing of database search strategies among users.

In one aspect of the system 100, if a user retrieves a search query from the Search Query Repository 108, the system permits the user to combine the retrieved query with other retrieved queries and with added search terms, thereby creating a new, more refined search query. This makes it easier for users to share search strategies and techniques, and to build upon the earlier work of others. If a user submits a search query to the Query Interface without a label and description, the system will automatically generate a label/description pair that will be associated with the search query. This again makes it more convenient for users to retrieve earlier queries and to share search strategies and techniques. The system also may associate search queries with a user identification (ID), to further facilitate communication of search information among users and sharing of search strategies. In addition, the user ID can be used to retrieve a search history record of all searches executed by a particular user. The user search history assists in building on search strategies and improves search techniques. In the preferred embodiment, authorized users can retrieve search histories for multiple users of the system, not just their own search histories.

Network Configuration

Figure 2:
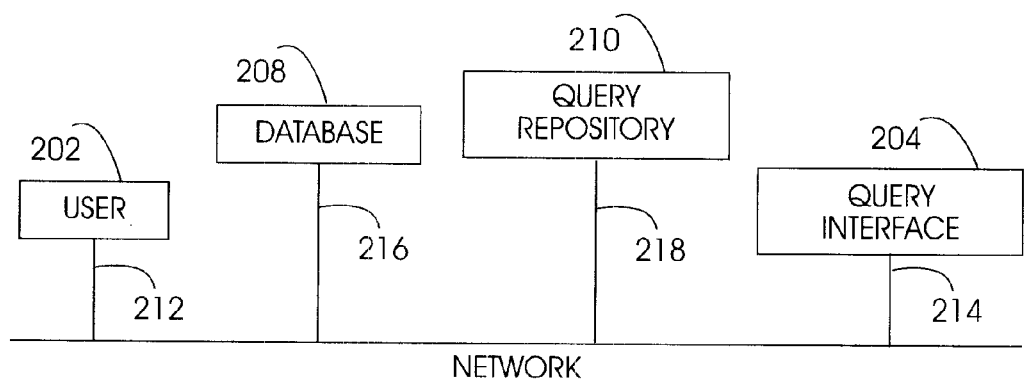
FIG. 2 is a representation of a computer processing system that provides search query labeling and reuse in accordance with the present invention.

FIG. 2 is a representation of a computer system 200 that provides search query labeling and reuse in accordance with the present invention. A search query is sent from a user computer 202 to a Query Interface Program computer 204 over a network 206. The network may comprise a local area network (LAN), an intranet, the Internet, or a combination of all three. The Query Interface Program applies the search query to either a database 208 of documents or to a Query Repository 210 that contains previously searched and labeled search queries. All of the computers 202, 204, 208, 210 are connected to the network 206 via respective network connections 212, 214, 216, 218.

In the preferred embodiment, a user can communicate with the Query Interface computer 204 from any computer connected via the network 206, and the Query Interface functionality is provided by a computer program that is installed in a separate computer 204 from the user computer 202. It should be understood, however, that the user computer and Query Interface can be provided in the same computer, if desired. In addition, all or part of the information contained in the document database 208 and Query Repository 210 may be stored at one or more computers communicating with the network 206, including the user computer 202 and Query Interface computer 204.

Query Interface Components

Figure 3:
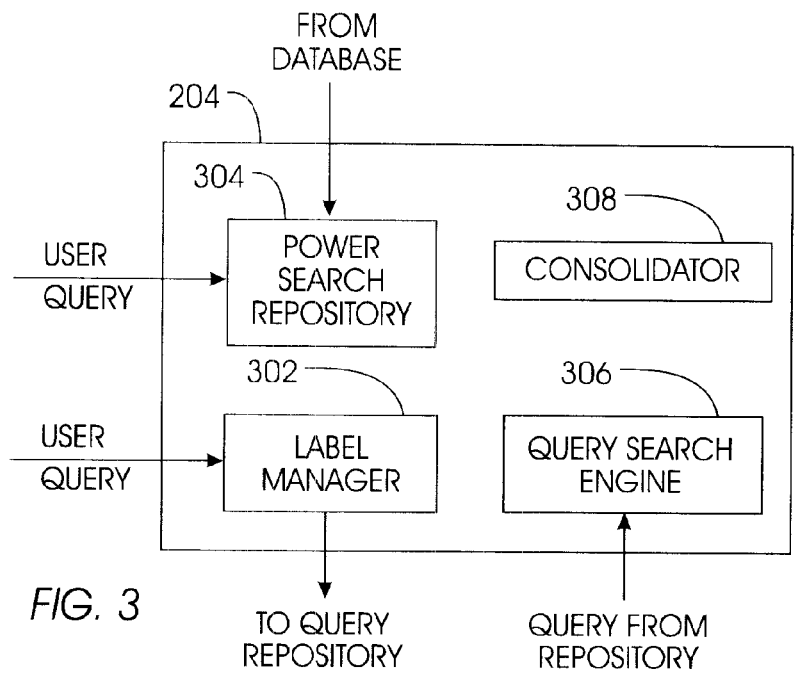
FIG. 3 is a representation of the functional components contained in the Query Interface computer illustrated in FIG. 2.

FIG. 3 is a representation of the functional components contained in the Query Interface 204 illustrated in FIG. 2. The Query Interface includes components necessary for managing receipt of user queries, applying search queries to the database, and controlling access to the Query Repository 210 (shown in FIG. 2). In the preferred embodiment, user interaction with the Query Interface is through a graphical user interface (GUI) program, such as a web browser or the like. Thus, access to the Query Interface can be achieved by directing a web browser program to an appropriate Internet address, or URL (Uniform Resource Locator).

A user submits a search query to the Query Interface through a form query window of the GUI program, described further below. The form window accepts a user input for a query label and for a corresponding query description, both of which will be associated with the search query in the Query Repository. The user's search query is initially received by a Label Manager 302 and a Power Search Repository 304. As described further below, the Label Manager will automatically generate a label/description pair for the received search query, if no label/description pair is provided by the user.

When the Label Manager 302 receives the user search query, the Label Manager stores the search query, the query label, and the query description in the Query Repository 210. The Label Manager also provides the query label and query description to the Query Search Engine 306 for processing. The Query Search Engine then compares the received query label and description to the label/description pairs stored in the Query Repository to find similar stored search queries. In the preferred embodiment, the Query Repository 210 is indexed according to any one of a variety of well-known indexing schemes, such that the Query Search Engine 306 can readily find and rank the stored labels and descriptions according to their similarity with the label and description received from the Label Manager 302. It should be understood that the label/description pairs stored in the Query Repository are associated with search queries that also are stored therein, and which can be retrieved once their associated label/description pair is identified and selected.

The Query Search Engine 306 identifies the most similar stored queries according to a predetermined criteria of relevance. The predetermined criteria of relevance will depend on the indexing scheme being used in the Query Repository 210 and may comprise, for example, a threshold value for a confidence level ranking arrangement. The details of such relevance criteria, ranking, and confidence level threshold will be readily understood by those skilled in the art without further explanation.

When the Query Interface Program 204 receives the user query, the Query Interface also provides the query to the Power Search Repository 304 component. In the preferred embodiment, the Power Search Repository applies the user search query to the database 208 (FIG. 2) and identifies the documents of the database that are most relevant to the user search query. As with the Query Search Engine 306, the relevance identification by the Power Search Repository 304 can comprise a ranking of the most similar documents according to the indexing scheme used in the database, and the Power Search Repository can identify all such documents that exceed a predetermined threshold relevance value or can identify a predetermined proportion of the identified documents, such as the top 10%.

A listing of the documents identified by the Power Search Repository 304 is provided to a Consolidator 308. Documents can then be retrieved by selecting items from the list. Alternatively, the documents can be retrieved from the database 208 and then provided to the Consolidator. Document identification and retrieval can occur, for example, according to database management systems such as the "Grand Central Station" system produced by International Business Machines Corporation (IBM Corporation). The document identification and retrieval can be accomplished using any query language specified by such systems, in a manner that will be known to those skilled in the art. The similar stored queries identified by the Query Search Engine also are provided to the Consolidator. The combined list of identified documents from the Power Search Repository and the list of similar queries from the Query Search Engine are displayed to the user through a search results display of the GUI system, as described further below.

In the search results display, the user can examine the results of the search query to review both the identified database documents and the similar queries. If the identified documents are not especially relevant, the user is free to select one of the similar queries so the Query Interface will cause the Power Search Repository to apply the selected similar query to the database. This process of beginning query, search, and review, and subsequent query, search, and review can be repeated as desired by the user.

Computer Construction

As noted above, the database 208 may comprise the various data files that are accessed via the well-known Internet system of file storage and retrieval. Therefore, those skilled in the art will appreciate that the database may comprise multiple Internet file server computers at which website files are stored. Those skilled in the art also will appreciate that the user computer 202, Query Interface Program computer 204, database computers 208, and Query Repository computer 210 can all have a similar computer construction.

Figure 4:
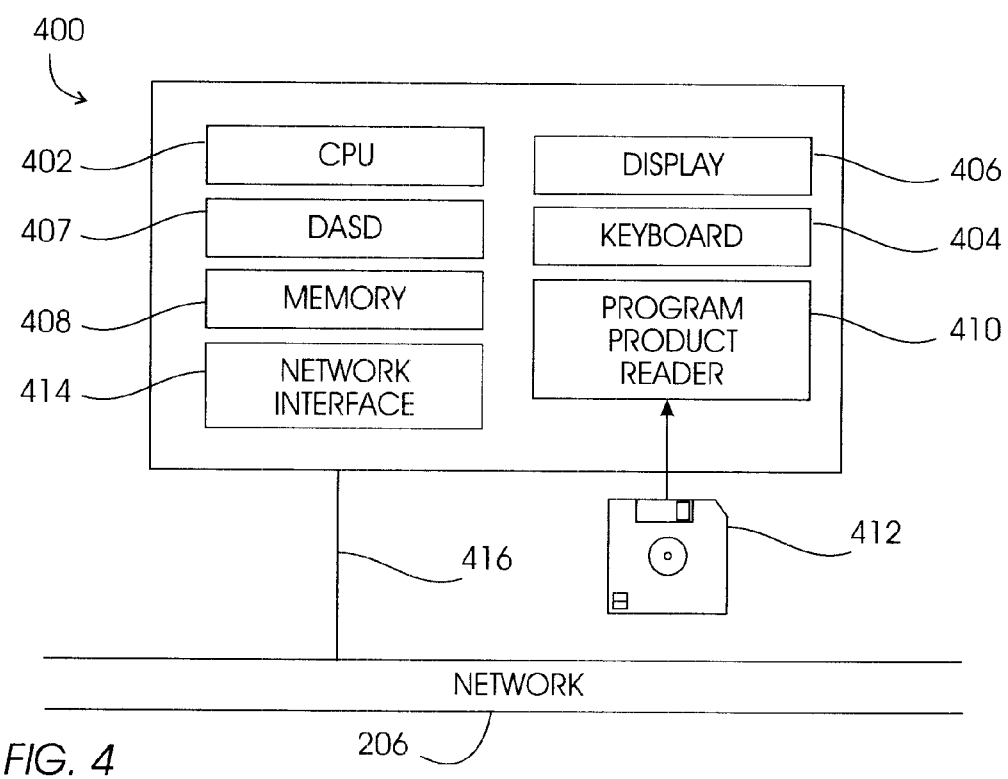
FIG. 4 is a block diagram of a computer in the system illustrated in FIG. 2.

FIG. 4 is a block diagram of an exemplary computer 400 such as might comprise any of the computers 202, 204, 208, 210. Each computer 400 operates under control of a central processor unit (CPU) 402, such as a "Pentium" microprocessor and associated integrated circuit chips, available from Intel Corporation of Santa Clara, Calif., USA. A computer user can input commands and data from a keyboard 404 and can view inputs and computer output at a display 406. The display is typically a video monitor or flat panel display. The computer 400 also includes a direct access storage device (DASD) 407, such as a hard disk drive. The memory 408 typically comprises volatile semiconductor random access memory (RAM). Each computer preferably includes a program product reader 410 that accepts a program product storage device 412, from which the program product reader can read data (and to which it can optionally write data). The program product reader can comprise, for example, a disk drive, and the program product storage device can comprise removable storage media such as a magnetic floppy disk, a CD-R disc, or a CD-RW disc. Each computer 400 communicates with the others over the network 206 through a network interface 414 that enables communication over a connection 416 between the network and the computer.

The CPU 402 operates under control of programming steps that are temporarily stored in the memory 408 of the computer 400. When the programming steps are executed, the Query Interface performs its functions. The programming steps can be received from the DASD 407, through the program product storage device 412, or through the network connection 416. The storage drive 410 can receive a program product 412, read programming steps recorded thereon, and transfer the programming steps into the memory 408 for execution. As noted above, the program product storage device can comprise any one of multiple removable media having computer-readable instructions, including floppy disks and CD storage. Other suitable program product storage devices can include magnetic tape and semiconductor memory. In this way, the processing steps necessary for operation in accordance with the invention can be embodied on a program product. Alternatively, the program steps can be received into the operating memory 408 over the network 206. In the latter method, the computer receives data into the memory 408 through the network interface 414 after network communication has been established over the network connection 416 by well-known methods that will be understood by those skilled in the art without further explanation.

It should be understood that all of the computers 202, 204, 208, 210 of the computer system illustrated in FIG. 2 have a construction similar to that shown in FIG. 4, so that details described with respect to the FIG. 4 computer 400 will be understood to apply to all computers of the system 200. Alternatively, any of the computers 202, 204, 208, 210 can have an alternative construction, so long as they can communicate with the other computers and support the functionality described herein.

System Operation

Figure 5:
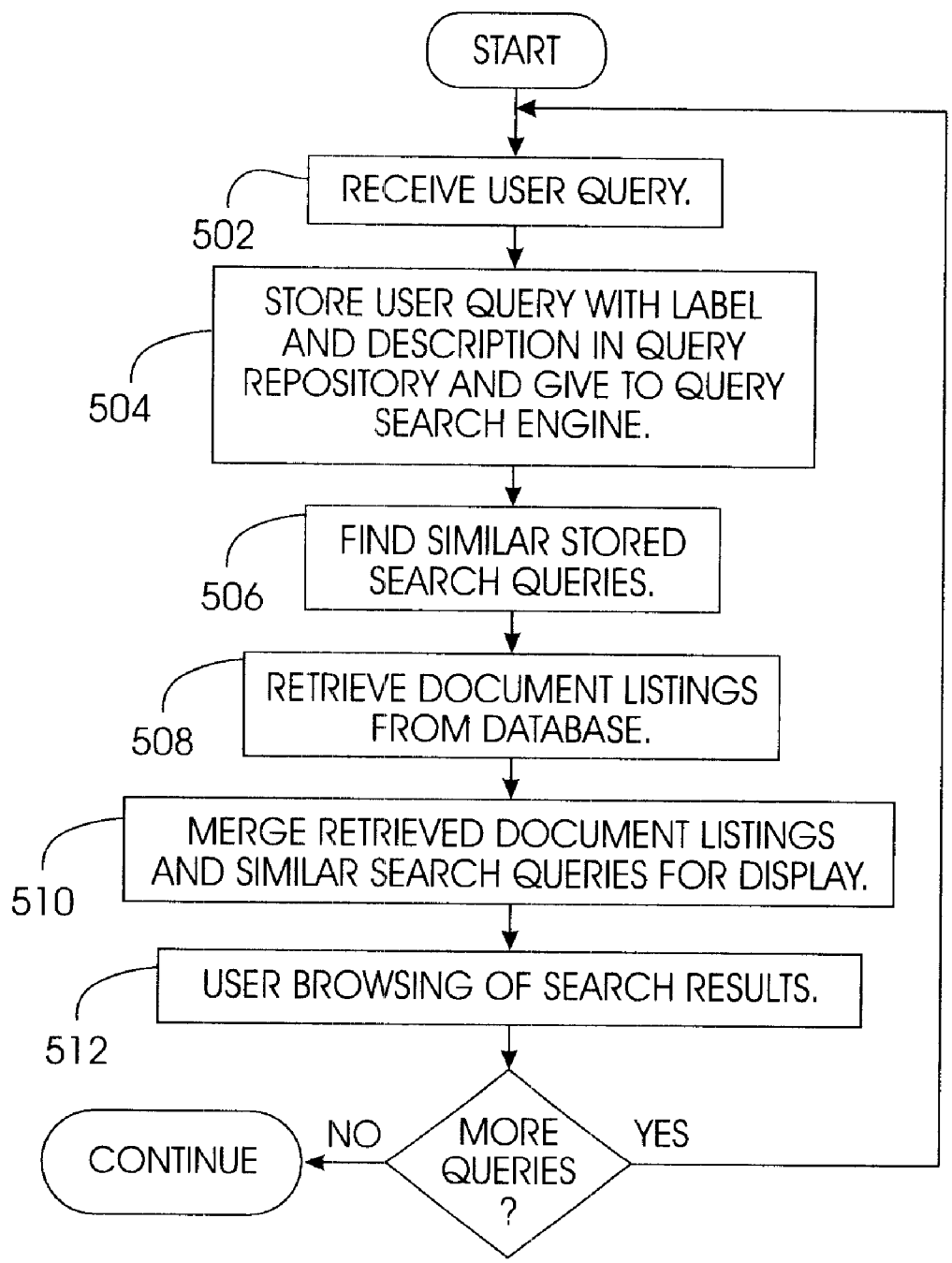
FIG. 5 is a flow diagram that illustrates the processing steps executed by the computer processing system of FIG. 2 to implement the search query reuse technique in accordance with the present invention.

FIG. 5 is a flow diagram that illustrates the processing steps executed by the computer processing system 200 of FIG. 2 to implement the search query labeling and reuse in accordance with the present invention. In the first step, represented by the FIG. 5 flow diagram box numbered 502, a user search query is received by the Query Interface and is provided to the Label Manager and the Power Search Repository components. The user search query comprises a query label, query description, and query string. The query string is typically a collection of words and phrases that will be matched to database documents or stored search queries. As noted above and described further below, the query label and query description can be automatically generated if they are not supplied by the user.

In the next step, the Label Manager component stores the user search query, along with the query label and query description, in the Query Repository, and also provides the query label and query description to the Query Search Engine. This processing is represented by the flow diagram box numbered 504. Next, the Query Search Engine finds similar queries in the Query Repository and provides them to the Consolidator. This processing is represented by the FIG. 5 flow diagram box numbered 506. The Power Search Repository, after receiving the query in fo the step represented by box 502, next retrieves documents matching or satisfying the user search query in the flow diagram box numbered 508 and provides them to the Consolidator. In step 510, the Consolidator merges the documents from the Power Search Repository and the similar queries from the Query Search Engine, and provides them in a display window that the user views from the computer display. The user is then free to browse the search results for relevant information from both the identified documents and the similar search queries, as indicated by the flow diagram box numbered 512.

Upon browsing the displayed search results on the computer display, the user can review both the identified database documents and the similar search queries and can, if desired, repeat the search process. Alternatively, the user may view one or more identified documents from the database before deciding whether to repeat the search process. These options are represented by the FIG. 5 decision box numbered 514. For example, if the identified database documents are not especially relevant, then the user may select one of the identified similar search queries so the Query Interface will cause the Power Search Repository to apply the selected similar search query to the database. This option is represented by the affirmative outcome at the decision box 514 and uses the selected query to start the process again at box 502. If the user does not desire to repeat searching, the user can first view the database documents identified by the Power Search Repository component and continue system processing. This alternative is indicated by the negative outcome at the decision box 514.

Figure 6:
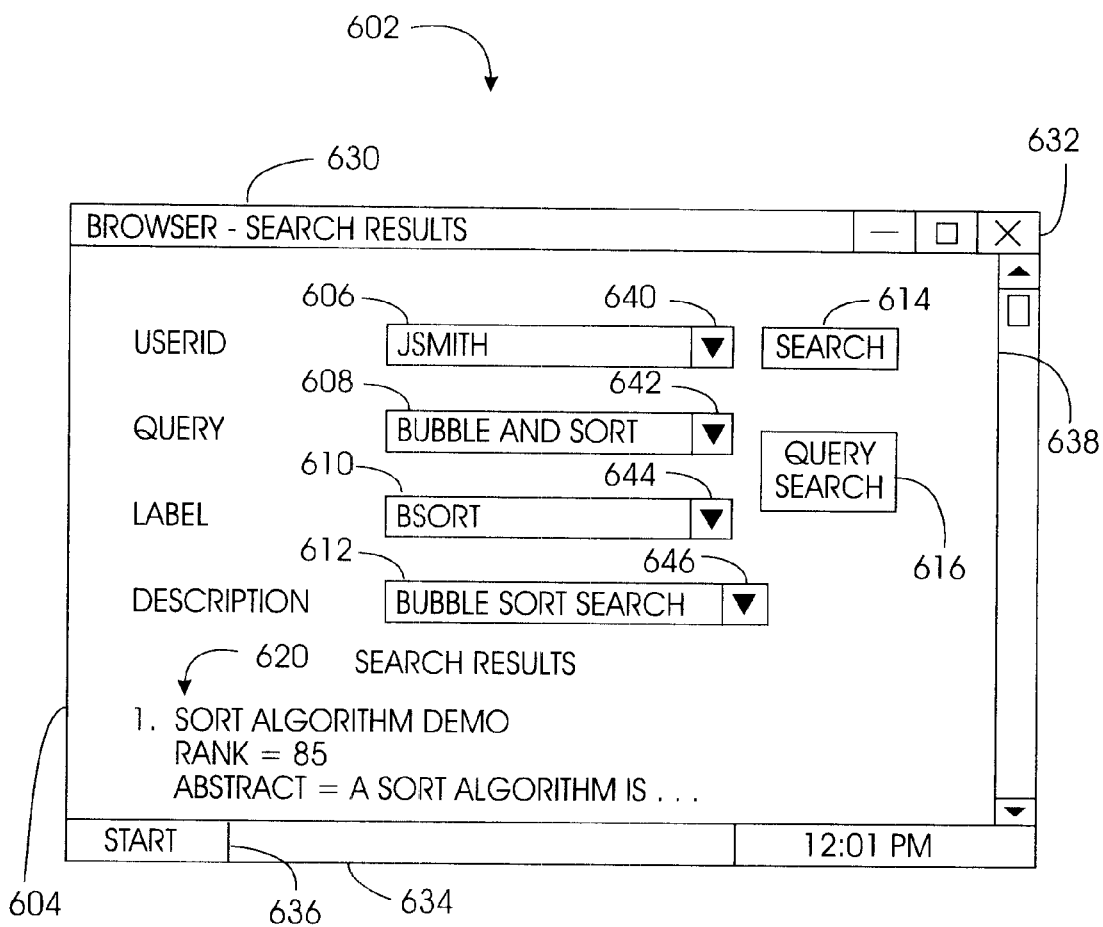
FIG. 6 is a representation of the search results display viewed by a user at the computer illustrated in FIG. 2.

As noted above, a user communicates with the Query Interface and receives search results through a GUI program, preferably a browser application. FIG. 6 is a representation of the display 602 that is presented to a user at the user computer 202 (FIG. 2) when viewing a Query Interface display window. FIG. 6 shows an example of a browser Search Results display window 604 with a user ID text box 606 that contains a user ID, a query text box 608 that contains a search query, a search label text box 610 that contains a search query label, and a search description text box 612 that contains a search query description. The FIG. 6 display shows a SEARCH button 614 that is selected by the user to initiate a search of the database using the query terms specified in the query box 608, and shows a QUERY SEARCH button 616 that can be selected by the user to initiate a search of the Query Repository using the query terms in the query box 608. Alternatively, a single SEARCH button can be provided to initiate simultaneous search of the data base and the Query Repository. At the bottom of the display window 604 is a listing of the search results, showing the entries in order of confidence level ranking. Those skilled in the art will recognize that a confidence level ranking is assigned by a search engine to indicate the similarity of the listed document to the search query.

The browser Search Results window 604 contains display artifacts that should be familiar to those skilled in the art, including a menu bar 630 with title, window sizing icons 632, and a display window tray 634. The "START" icon 636 provides access to a variety of operating system commands and will be familiar to those skilled in the art. A vertical scrolling bar 638 on the right edge of the window 604 can be used to scroll up and down the search results information, to view the remaining search results documents 620 not readily visible in the window. Although the display window 604 shows a configuration typical for an operating system such as "Windows 98" by Microsoft Corporation, it should be understood that the viewer browser program also can be interfaced with other computer operating systems, such as the "Macintosh" operating system by Apple Computer Corporation and the various UNIX operating systems that are available.

Figure 7:
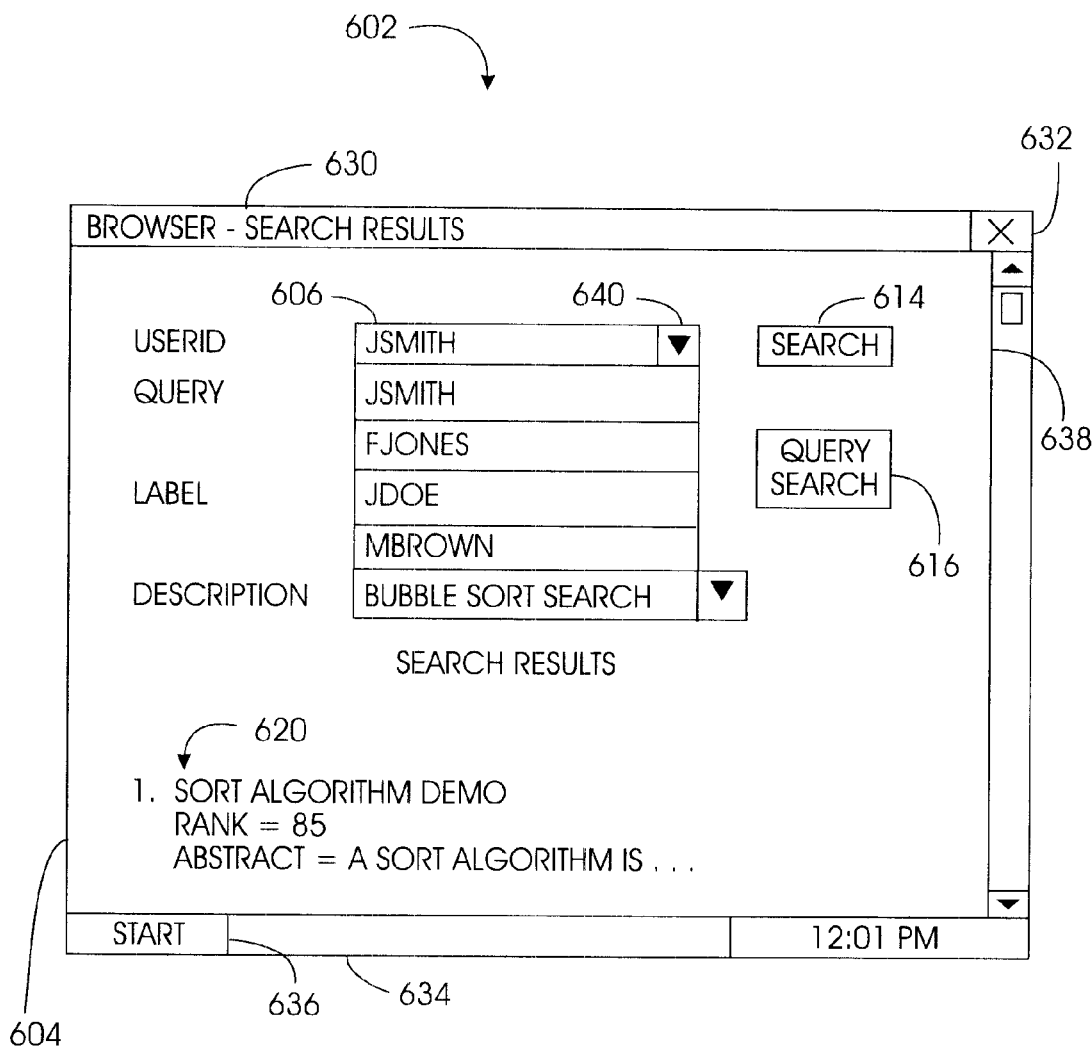
FIG. 7 is a representation of the search results display of FIG. 6 with the user ID drop-down list.

Additional features provided by the present invention are shown in FIG. 6. For example, the user ID text box 606 includes a list button 640 that, when selected by the user, causes a drop-down list to appear with a user ID list. The user can then select from among the available user ID entries and thereby gain access to the queries previously submitted by other users. FIG. 7 shows the user ID drop-down list 702 in the search results window 604 after the user has selected the user ID list button 640. It should be apparent that a user may select one of the names from the drop-down list 702 to thereby change the information shown in the user ID text box 606, as well as change the corresponding information in the other text boxes 608, 610, 612 where appropriate. With respect to selection of a new user ID, the Query Interface can resolve issues of authorization and network security to control access to other user query histories, if desired. Those skilled in the art will be familiar with the drop-down list as a means of presenting system information.

Returning to FIG. 6, the query text box 608 includes a list button 642 that causes a drop-down list to appear with a list of search queries. The queries in the query drop-down list comprise a history of the search queries submitted by the user identified in the user ID text box 606. The query label text box 610 includes a list button 644 that causes a drop-down list to appear with a list of search query labels, and the query description text box 612 includes a list button 646 that causes a drop-down list to appear with a list of search query descriptions from the searches associated with the user ID in the box 606. Those skilled in the art will understand that selection of an item from any of the drop-down lists 640, 642, 644, 646 will cause the information shown in the remaining text boxes to display appropriate information associated with the selected drop-down list information.

Label Manager

As noted above, if a user submits a search query to the Query Interface without a label and description, then the system will automatically generate a label/description pair that will be associated with the search query. Automatic label/description generation eliminates the need for a user to manually enter such information with a query, and does not rely on the voluntary cooperation of users to generate labels of their own. In the system constructed in accordance with the present invention, this automatic label generation and query association is based on the words and phrases contained in the search query itself, and thereby facilitates retrieval of prior searches and sharing of search strategies. Thus, every search query will be associated with a label and description. The automatic generation of a label/description pair is performed by the Label Manager, which is illustrated in FIG. 8.

Figure 8:
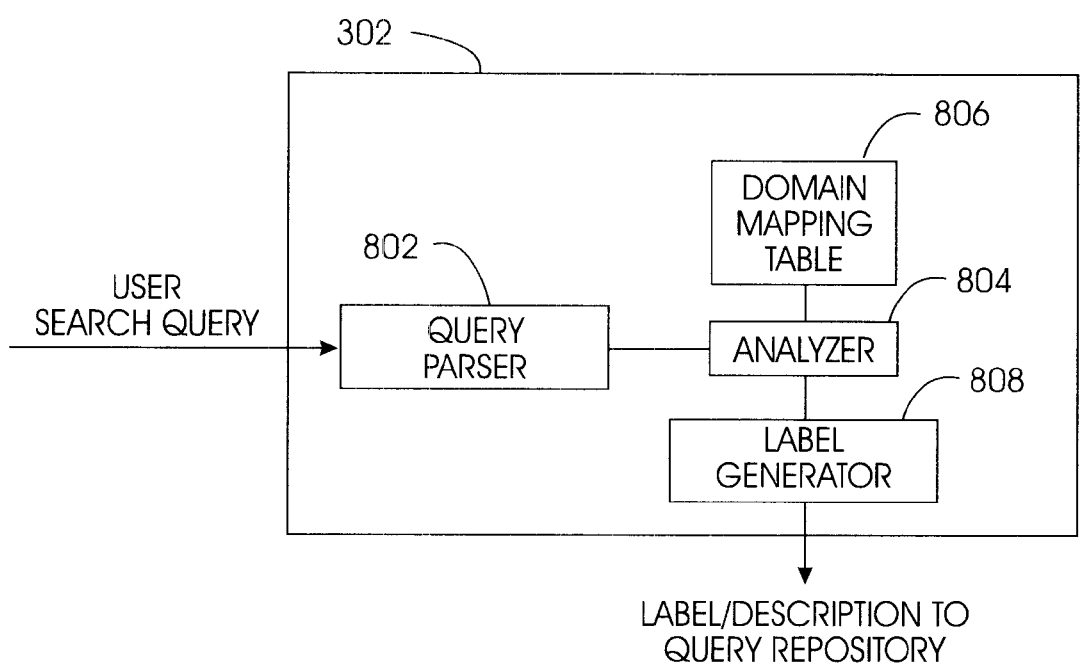
FIG. 8 is a block diagram of the Label Manager illustrated in FIG. 2.

FIG. 8 shows that the Label Manager 302 includes a Query Parser 802, which receives the search query from the user. A search query can contain words and phrases that are joined by Boolean operators, wildcard characters, queries limited to specified information categories or domains, and the like. The Query Parser will generate tokens and will parse the search query to create an intermediate representation. In a browser-based implementation, the intermediate representation is based on the Extended hypertext Mark-Up Language (XML). In this way, the Query Parser can be implemented in the user's browser (client side) or can be implemented in the Query Interface (server side) component. In the preferred embodiment, the Query Interface is a completely server-side implementation, so that a conventional web browser can be used to gain access to the query reuse features of the invention.

The Analyzer 804 of the Label Manager component receives the intermediate representation from the Query Parser 802 and examines the query components to determine the context of the query, as well as the query domain, or category. The Analyzer transforms the intermediate representation to provide a representation that includes the context and domain information. The Analyzer performs this transformation with reference to a domain mapping table 806. The domain mapping table comprises a hash table that contains domain-specific query commands, used as indexing keys, and contains corresponding values that are short, human-readable descriptors of the keys.

The domain mapping table permits the Query Search Engine to use any query language that is most effective for its purposes, while associating the indexing keys specified for the query language with a more human-understandable descriptor that can be presented to the user as part of a query label and description pair. For example, a query search for finding newsgroup articles on Java-language computer source code at Stanford University related to a bubble sort algorithm may include a combination of words as phrases such as: "CATEGORY newsgroups AND CATEGORY Java source code AND bubble AND sort AND DOMAIN stanford", where upper case words denote special terms or Boolean operators. The query language may transform such a search query into a phrase such as "<Category NewsgroupArticles> AND <Category JavaSourceCodes> AND <bubble> AND <sort> AND <domain Stanfordedu>". The domain mapping table would transform a phrase such as "Category JavaSourceCodes" into "Java source code", which is more readily recognized and understood by humans. A phrase such as "bubble AND sort" would be transformed into "bubble sort".

Those skilled in the art will appreciate that the categories or domains will contain predetermined domain-specific attributes, which might consist of less discernible titles than in the example above. A category for Java "beans" applets concerned with collecting user information, for example, might be identified by the query language as the phrase comprising <Category JavaBUserInfoColl>, which the Analyzer would transform into a more readable format using the domain mapping table.

Finally, FIG. 8 shows that the Label Manager 302 includes a Label Generator 808, which receives the intermediate representation from the Analyzer 804 and generates a query label and description using the transformed phrasing from the domain mapping table 806. The label and description are then stored in-the Query Repository shown in FIG. 2.

Figure 9:
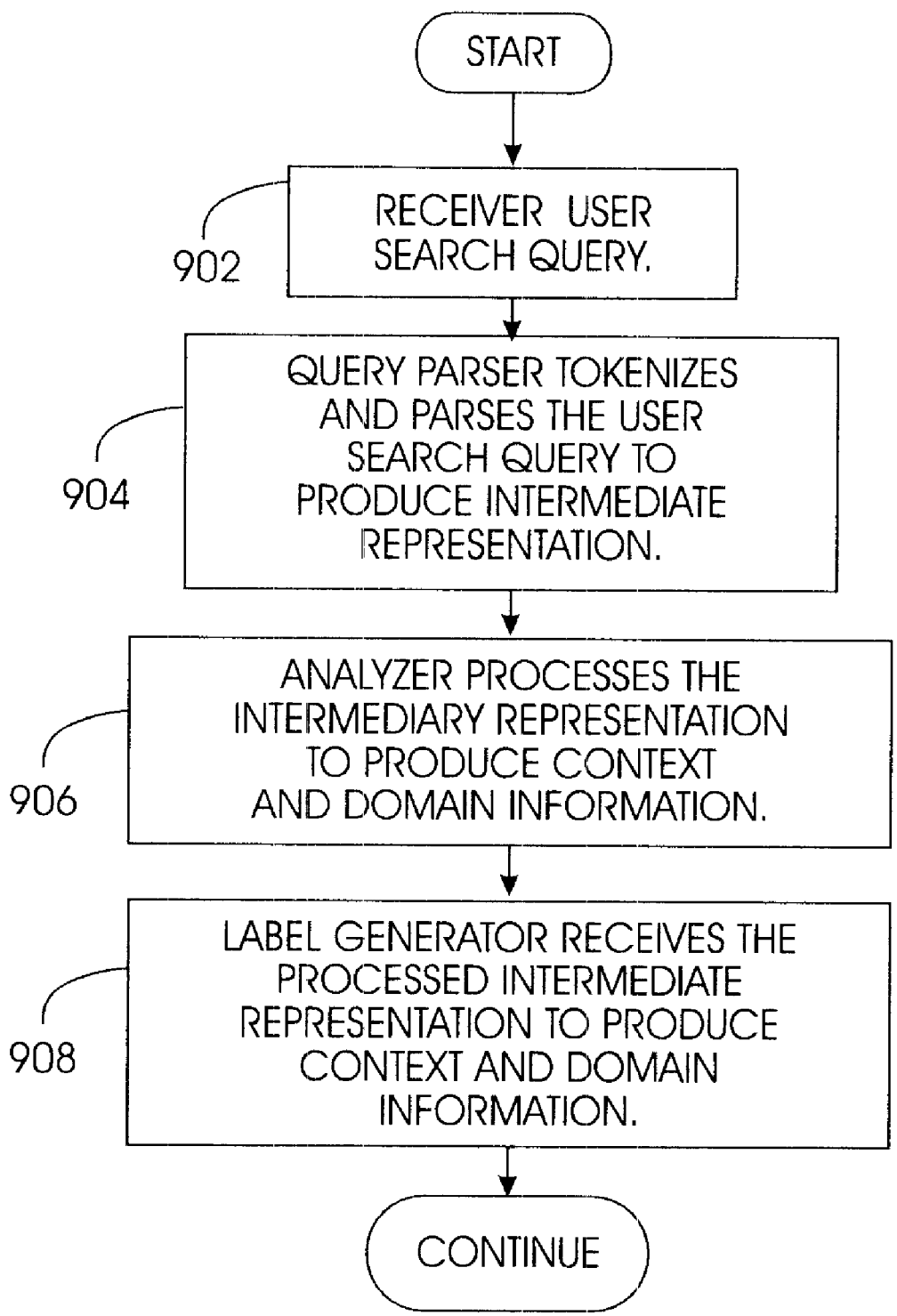
FIG. 9 is a flow diagram that illustrates the processing steps executed by the computer processing system of FIG. 2 to implement automatic generation of the search query label and search query description.

FIG. 9 is a flow diagram that illustrates the processing steps executed by the computer processing system of FIG. 2 to implement automatic generation of the search query label and search query description. In the first processing step, represented by the flow diagram box numbered 902, the Label Manager receives the search query from the user. The search query will comprise a mixture of words and phrases, with predetermined attributes such as DOMAIN or CATEGORY and with Boolean operators such as AND, OR, and NOT.

In the next step, the Query Parser receives the search query, parses the query into recognized phrases and words, and generates tokens or query-language representations of the query components. This step generates the intermediate representation, and is represented by the flow diagram box numbered 904. The Analyzer performs the next step, which is represented by the flow diagram box numbered 906. This step is to produce the context and domain information in a form that will be more readily recognizable by a human reader, based on the information in the domain mapping table. The final step, label generation, is represented by the flow diagram box numbered 908. This step results in the label-description pair associated with the search query and stored in the Query Repository.

Search History, Combination, and Reuse

The preferred embodiment of the system permits examination of a search history for a particular user. This is a means for multiple users to share their search results and strategies, even if the users know nothing about their mutual search efforts. The system provides this means by using search history information for individual users, in the form of user ID/search query label/search query description tuples stored in the Query Repository, to perform a search for label/description pairs that are related to a given search query.

Figure 10:
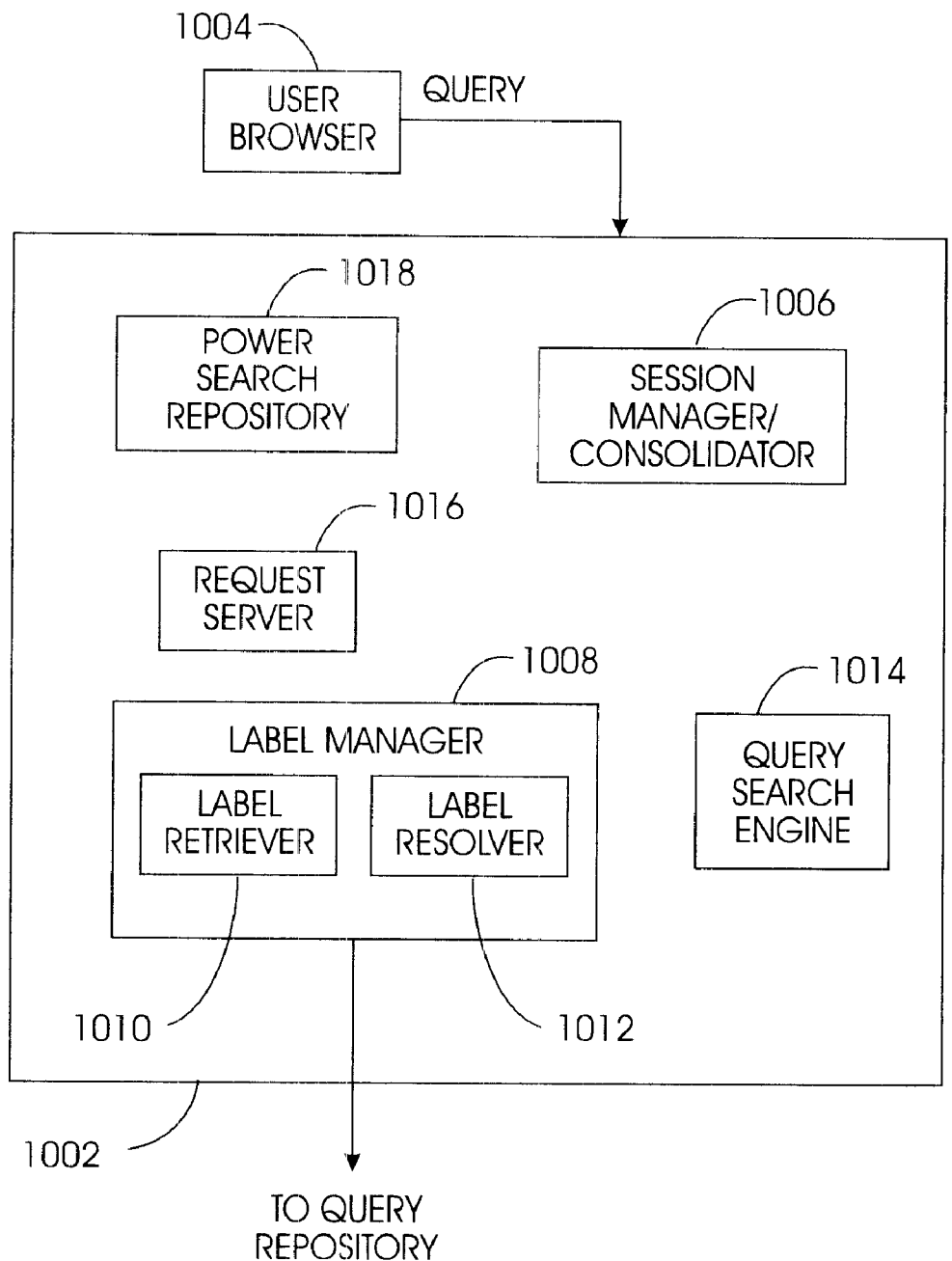
FIG. 10 is a block diagram of an alternative embodiment for the Query Interface illustrated in FIG. 2, showing query combination and reuse features.

FIG. 10 is a block diagram of an alternative embodiment for the Query Interface illustrated in FIG. 2, showing search history retrieval, query combination, and query reuse features. FIG. 10 shows that the Query Interface 1002 receives a query from a user browser 1004, and the query is provided to a Session Manager/Consolidator component 1006 (hereafter referred to as the Session Manager). Along with the search query, the Session Manager receives a user ID. The user ID may comprise, for example, a log-in identification name of a user. If no user ID is supplied, a default user ID may be used if desired, to provide continued access, but no user history will be available for searching on queries.

The search query is processed by the Session Manager 1006 in cooperation with the Label Manager 1008. The user ID is used by a Label Retriever 1010 to examine the Query Repository for matching user ID information. This identifies the query history for the person corresponding to the received user ID. In addition, the user ID helps to properly identify searches where multiple users have selected the same label and/or description to identify two different searches. If the user has provided a search label and description with the current search query, then a Label Resolver 1012 transforms the query into a form that can be used by the Query Search Engine 1014 to perform the requested query. This process is essentially an inverse processing step that reverses the intermediate transformation described above.

The results of processing by the Label Retriever 1010 and Label Resolver 1012 are used by a Request Server 1016 to integrate the label information and provide the results of query retrieval to the user. Any prior search queries needed are retrieved from the Power Search Repository 1018 and presented by the Request Server to the user. If the user provides a search query with no label or description, then the query is processed as described above, with automatic label generation. Thus, the label/description pair generated by the Label Generator is provided to the Query Repository.

Figure 11:
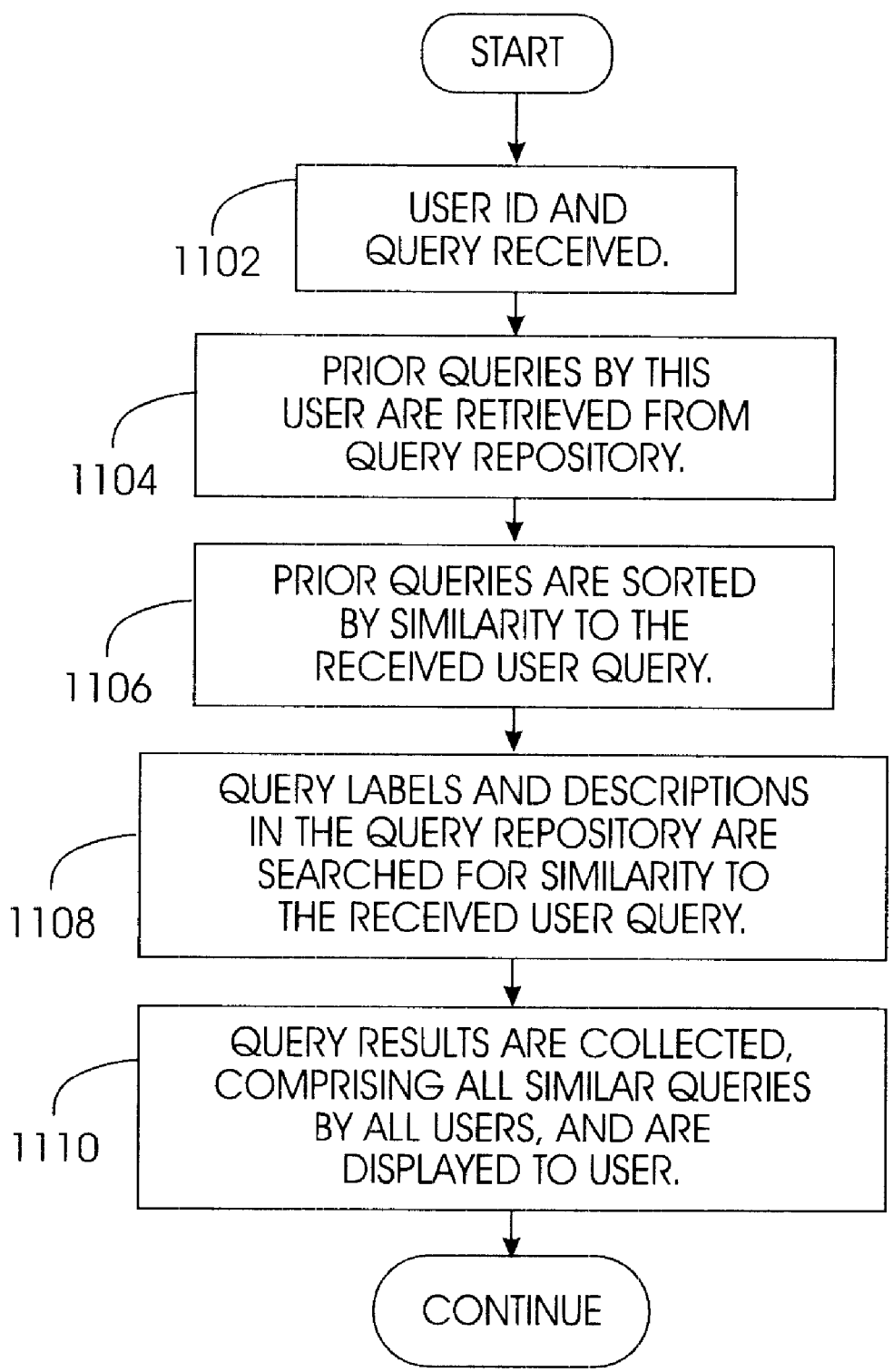
FIG. 11 is a flow diagram that illustrates the processing steps executed by the computer processing system of FIG. 2 to implement searching of personal history search queries, and query combining and reuse.

FIG. 11 is a flow diagram that illustrates the processing steps executed by the computer processing system of FIG. 2 to implement the listing and searching of personal history search queries.

In the first processing step, represented by the flow diagram box numbered 1102, the search query with user ID is received. The user ID may comprise, for example, a log-in identification name of a user. If no user ID is supplied, a default user ID may be used if desired, to provide continued access, but no user history will be available for searching on queries. In the next processing step, the system finds all prior queries submitted by the person associated with the received user ID. These queries will be retrieved from the Query Repository. This processing step is represented by the flow diagram box numbered 1104.

Next, the system sorts the prior search queries according to similarity with the received user query, as represented by the flow diagram box numbered 1106. The system then searches the Query Repository for query labels and descriptions for other-user searches that are similar to the current search query. This step is represented by the flow diagram box numbered 1108. The system then collects the query results for presentation to the user, represented by the flow diagram box numbered 1110.

The present invention has been described above in terms of presently preferred embodiments so that an understanding of the present invention can be conveyed. There are, however, many configurations for search query systems not specifically described herein but with which the present invention is applicable. The present invention should therefore not be seen as limited to the particular embodiments described herein, but rather, it should be understood that the present invention has wide applicability with respect to search query systems generally. All modifications, variations, or equivalent arrangements and implementations that are within the scope of the attached claims should therefore be considered within the scope of the invention.

We claim:

1. A method of operating a computer system to process a search query and identify database documents of interest, the method comprising the steps of:
   receiving a search query from a client user;
   storing the search query, and a query label and query description associated with the search query, in a Query Repository that is shared and accessible by multiple users;
   finding documents in a database that match the received search query;
   responding to a query search request from the client user by searching the shared Query Repository to find stored search queries that are similar to the received search query, the stored search queries being storable in the Query Repository by multiple users;
   presenting the found database documents and the found stored search queries to the client user for review;
   modifying a similar search query that was found in the Query Repository from the step of responding to a query search request to generate a new search query; and
   processing the new search query to identify database documents of interest.

2. A method as defined in claim 1, wherein the step of storing the search query comprises automatically generating a query label and query description if the client user has not provided them with the search query.

3. A method as defined in claim 2, wherein the step of storing further comprises associating a client user identification with the search query.

4. A method as defined in claim 2, wherein automatically generating a query label and query description comprises:
   parsing and tokenizing the search query to produce an intermediate search query format; and
   producing the query label and query description from the intermediate search query.

5. A method as defined in claim 4, wherein producing the query label and query description comprises consulting a domain mapping table to transform the intermediate search query format to a query label and query description that are human readable.

6. A method as defined in claim 1, further comprising the step of associating a query label and query description with the new search query.

7. A method as defined in claim 6, wherein the step of storing the search query comprises automatically generating a query label and query description if the client user has not provided them with the search query.

8. A method as defined in claim 7, wherein the step of storing further comprises associating a client user identification with the search query.

9. A method as defined in claim 7, wherein automatically generating a query label and query description comprises:
   parsing and tokenizing the search query to produce an intermediate search query format; and
   producing the query label and query description from the intermediate search query.

10. A method as defined in claim 9, wherein producing the query label and query description comprises consulting a domain mapping table to transform the intermediate search query format to a query label and query description that are human readable.

11. A method as defined in claim 1, further comprising the step of associating a client user identification with the new search query.

12. A computer system that processes a search query to identify database documents. of interest, the system comprising:
   a Session Manager/Consolidator that receives a search query from a client user;
   a Label Manager that stores the search query, and a query label and query description associated with the search query, in a Query Repository that is shared and accessible by multiple users over a network;
   a Power Search Repository that finds documents in a database that match the received search query; and
   a Query Search Engine that responds to a query search request from the client user by searching the shared Query Repository to find stored search queries that are similar to the received search query, the stored search queries being storable in the Query Repository by multiple users;
wherein the Session Manager/Consolidator presents the found database documents and the found stored search queries to the client user for review, and wherein the Session Manager/Consolidator permits modifying a similar search query that was found in the Query Repository to generate a new search query, and processing the new search query to identify database documents of interest.

13. A system as defined in claim 12, wherein the Label Manager automatically generates a query label and query description if the client user has not provided them with the search query.

14. A system as defined in claim 13, wherein the Label Manager associates a client user identification with the search query.

15. A system as defined in claim 13, wherein the Label Manager automatically generates a query label and query description by:

parsing and tokenizing the search query to produce an intermediate search query format; and producing the query label and query description from the intermediate search query.

16. A system as defined in claim 15, wherein the Label Manager produces the query label and query description by consulting a domain mapping table to transform the intermediate search query format to a query label and query description that are human readable.

17. A system as defined in claim 12, wherein the Label Manager associates a query label and query description with the new search query.

18. A system as defined in claim 17, wherein the Label Manager automatically generates a query label and query description if the client user has not provided them with the search query.

19. A system as defined in claim 18, wherein the Label Manager associates a client user identification with the search query.

20. A system as defined in claim 18, wherein the Label Manager automatically generates a query label and query description by:

parsing and tokenizing the search query to produce an intermediate search query format; and producing the query label and query description from the intermediate search query.

21. A system as defined in claim 20, wherein the Label Manager produces the query label and query description by consulting a domain mapping table to transform the intermediate search query format to a query label and query description that are human readable.

22. A system as defined in claim 12, wherein the Label Manager associates a client user identification with the new search query.

23. A system as defined in claim 12, wherein the Session Manager/Consolidator, Label Manager, Power Search Repository, and Query Search Engine are all contained in a single server-side computer.

24. A program product for use in a computer system that executes program steps recorded in a computer-readable media to perform a method of operating a computer system to process a search query and identify database documents of interest, the program product comprising:

a recordable media;

a program of computer-readable instructions executable by the computer system to perform steps comprising:

receiving a search query from a client user;

storing the search query, and a query label and query description associated with the-search query, in a Query Repository that is shared and accessible by multiple users;

finding documents in a database that match the received search query;

responding to a query search request from the client user by searching the shared Query Repository to find stored search queries that are similar to the received search query, the stored search queries being storable in the Query Repository by multiple users;

presenting the found database documents and the found stored search queries to the client user for review;

modifying a similar search query that was found in the Query Repository from the step of responding to a query search request to generate a new search query; and processing the new search query to identify database documents of interest.

25. A program product as defined in claim 24 wherein the program step of storing the search query comprises automatically generating a query label and query description if the client user has not provided them with the search query.

26. A program product as defined in claim 25, wherein the program step of storing further comprises associating a client user identification with the search query.

27. A program product as defined in claim 25, wherein the program step of automatically generating a query label and query description comprises:

parsing and tokenizing the search query to produce an intermediate search query format; and producing the query label and query description from the intermediate search query.

28. A program product as defined in claim 27, wherein the program step of producing the query label and query description comprises consulting a domain mapping table to transform the intermediate search query format to a query label and query description that are human readable.

29. A program product as defined in claim 24, further comprising the program step of associating a query label and query description with the new search query.

30. A program product as defined in claim 29, wherein the program step of storing the search query comprises automatically generating a query label and query description if the client user has not provided them with the search query.

31. A program product as defined in claim 30, wherein the program step of storing further comprises associating a client user identification with the search query.

32. A program product as defined in claim 30, wherein the program step of automatically generating a query label and query description comprises:

parsing and tokenizing the search query to produce an intermediate search query format; and producing the query label and query description from the intermediate search query.

33. A program product as defined in claim 32, wherein the program step of producing the query label and query description comprises consulting a domain mapping table to transform the intermediate search query format to a query label and query description that are human readable.

34. A program product as defined in claim 24, further comprising the program step of associating a client user identification with the new search query.

* * * * *